United States Patent
Tulkoff et al.

(10) Patent No.: US 7,415,484 B1
(45) Date of Patent: Aug. 19, 2008

(54) METHOD AND SYSTEM FOR MODELING OF SYSTEM CONTENT FOR BUSINESSES

(75) Inventors: Michael C. Tulkoff, Austin, TX (US); Jeffrey M. Collins, Austin, TX (US); Mark Scheevel, Austin, TX (US)

(73) Assignee: Vignette Corporation, Austin, TX (US)

( * ) Notice: Subject to any disclaimer, the term of this patent is extended or adjusted under 35 U.S.C. 154(b) by 546 days.

(21) Appl. No.: 10/434,936

(22) Filed: May 9, 2003

(51) Int. Cl.
*G06F 7/00* (2006.01)
*G06F 9/44* (2006.01)

(52) U.S. Cl. ................ 707/104.1; 719/328; 719/320

(58) Field of Classification Search ................ 719/311, 719/328; 717/120, 121, 100–105; 715/501.1, 715/513, 748, 750, 751, 733, 734, 737, 738, 715/741–743; 709/201–207, 217–219; 707/1–10, 707/100–104.1, 201–205; 705/1–10; 713/182–184
See application file for complete search history.

(56) References Cited

U.S. PATENT DOCUMENTS

| | | | |
|---|---|---|---|
| 6,826,727 B1 | 11/2004 | Mohr | |
| 6,850,893 B2 * | 2/2005 | Lipkin et al. ................ | 705/8 |
| 6,898,609 B2 | 5/2005 | Kerwin | |
| 6,910,040 B2 | 6/2005 | Emmick | |
| 7,062,705 B1 * | 6/2006 | Kirkwood et al. ........... | 715/500 |
| 7,069,271 B1 * | 6/2006 | Fadel et al. ................. | 707/102 |
| 7,117,252 B1 * | 10/2006 | Kumakura .................. | 709/217 |
| 7,188,332 B2 * | 3/2007 | Charisius et al. ............ | 717/104 |
| 2002/0147644 A1 * | 10/2002 | Subramanian et al. ........ | 705/14 |
| 2003/0065898 A1 | 4/2003 | Flamma et al. | |
| 2003/0105654 A1 | 6/2003 | MacLeod et al. | |
| 2003/0105770 A1 | 6/2003 | MacLeod | |
| 2003/0149934 A1 * | 8/2003 | Worden ...................... | 715/513 |
| 2003/0195885 A1 | 10/2003 | Emmick et al. | |
| 2003/0195923 A1 | 10/2003 | Bloch | |
| 2004/0122849 A1 * | 6/2004 | Nelson ........................ | 707/102 |
| 2004/0187100 A1 | 9/2004 | Thiruvillamalai | |
| 2004/0205075 A1 * | 10/2004 | LaTurner et al. ............ | 707/100 |
| 2005/0044103 A1 * | 2/2005 | Macleod et al. ............. | 707/102 |

OTHER PUBLICATIONS

United States Patent Office Official Action issued in U.S. Appl. No. 10/716,093, Oct. 15, 2007.

* cited by examiner

*Primary Examiner*—Wiiliam Thomson
*Assistant Examiner*—Charles E Anya
(74) *Attorney, Agent, or Firm*—Sprinkle IP Law Group

(57) ABSTRACT

A method and system of managing content at a network site can allow easier use by business users. A higher level of abstraction can be used to allow business users to create their own objects that may reference or contain other objects or records as managed by a content management system. Business users do not have to learn programming code in order to work those objects, which are content types. A graphical user interface ("GUI") can be used to help the business users to create, modify, and delete content types. The GUI and the ability for business users to the create content types greatly shortens the time between receiving software to operate a network site and launching content at that network site.

14 Claims, 10 Drawing Sheets

Article

| General | Attributes | Workflow | Security | Status |

Data Source: AppSvcs Resource [Change...] — 602

Attribute List:

⊕ New Extensible Attribute    ⊕ New Data Source Attribute    ⇧ Move Up    ⇩ Move Down    ✕ Remove

| | Name 640 | XML Name 642 | Type 646 | Length 648 | Widget 650 | Searchable 652 | Default Label 654 | Summary 656 | Visible 658 | Requ 630 |
|---|---|---|---|---|---|---|---|---|---|---|
| ☐ | ARTICLE ID 622 | TULK1-ARTICLE-ARTICLE-ID 624 | INT | n/a | VCMGetNextIdWidget 626 | ☑ | ☐ | ☐ | ☑ | ☑ |
| ☐ | TITLE | TULK1-ARTICLE-TITLE | STRING | 255 | VCMTextWidget | ☑ | ☑ | ☑ | ☑ | ☑ |
| ☐ | SUMMARY | TULK1-ARTICLE-SUMMARY | STRING | 255 | VCMTextWidget | ☑ | ☐ | ☑ | ☑ | ☑ |
| ☐ | BODY | TULK1-ARTICLE-BODY | STRING | 1024 | VCMTextAreaWidget | ☑ | ☐ | ☑ | ☑ | ☐ |
| ☐ | AUTHOR | TULK1-ARTICLE-AUTHOR | INT | n/a | VCMSelectWidget | ☑ | ☐ | ☑ | ☑ | ☐ |
| ☐ | IMAGE | TULK1-ARTICLE-IMAGE | STRING | 1024 | VCMFileWidget | | | | | |

[OK] [Cancel] [Apply] [Help]

*FIG. 6*

| Product | | | | | | | | | |
|---|---|---|---|---|---|---|---|---|---|
| General | Attributes | Workflow | Security | Status | | | | | |

Data Source: [ Change.... ]

Attribute List:

✚ New Extensible Attribute    ✚ New Data Source Attribute    ⬆ Move Up    ⬇ Move Down    ✕ Remove

| | 640<br>Name | 642<br>XML Name | 646<br>Type | 648<br>Length | 650<br>Widget | 652<br>Searchable | Default | Label | Summary |
|---|---|---|---|---|---|---|---|---|---|
| ☐ | PRODUCT ID | TULK1-PRODUCT-PRODUCT-ID | INT | n/a | VCMGetNextIdWidget | ☑ | ☐ | ☐ | ☐ |
| ☐ | Product Name | TULK1-PRODUCT-NAME | STRING | 50 | VCMTextWidget | ☑ | ☐ | ☐ | ☐ |
| ☐ | Product Description | TULK1-PRODUCT-DESCRIPTION | STRING | 1024 | VCMTextAreaWidget | ☑ | ☐ | ☐ | ☐ |
| ☐ | SKU ID | TULK1-SKU-SKU-ID | INT | n/a | VCMGetNextIdWidget | ☑ | ☐ | ☐ | ☐ |
| ☐ | SKU Name | TULK1-SKU-NAME | STRING | 255 | VCMTextWidget | ☑ | ☐ | ☐ | ☐ |
| ☐ | SKU Description | TULK1-SKU-DESCRIPTION | STRING | 1024 | VCMTextAreaWidget | ☑ | ☐ | ☐ | ☐ |
| ☐ | Color | TULK1-SKU-COLOR | STRING | 10 | VCMTextWidget | ☑ | ☐ | ☐ | ☐ |
| ☐ | Price | TULK1-SKU-PRICE | STRING | 10 | VCMTextWidget | ☑ | ☐ | ☐ | ☐ |
| ☐ | PRODUCT ID | TULK1-SKU-PRODUCT-ID | INT | n/a | VCMRelatorWidget | | ☐ | ☐ | ☐ |

[ OK ]   [ Cancel ]   [ Apply ]   [ Help ]

*FIG. 9*

METHOD AND SYSTEM FOR MODELING OF SYSTEM CONTENT FOR BUSINESSES

RELATED APPLICATION

This application is related to U.S. patent application Ser. No. 10/434,935 entitled "Method and System for Deployment of Content Using Compound Objects" by Scheevel et al. filed May 9, 2003, which is assigned to the current assignee hereof and incorporated herein by reference.

FIELD OF THE INVENTION

This invention relates in general to methods and systems for managing content, and more particularly, to methods and systems of managing content at a network site to allow content types to be defined and modified in a manner that reflects the way a business uses and thinks about its content.

DESCRIPTION OF THE RELATED ART

Content management at web sites is becoming increasingly complicated as more content is used at those web sites. Companies are finding that managing the content is proving to be a daunting task. The organization of content and information is constantly changing. Within an older web site, all information for a content object may be self contained (does not reference another content object). A problem is that the content management systems used for those older sites do not understand the relationships among the content items, and consequently, provide effectively no help whatsoever in managing those relationships.

In the past, an object type called a "record" was an example of this generic content object at the tuple granularity. A record may include (1) a reference to a tuple (row) within a table of a database and (2) metadata (e.g., state information). Companies creating web sites using these records have typically found that they are very limited in real life. Complex relationships may occur between data, and there is no practical way to manage all the rows that may get returned for a relationship. For example, an article may contain a reference to authors. However, the authors may span across many rows within one or more databases.

Users of content management software at a business may also find the software to be "user hostile" (i.e., not user friendly). The coding for types of objects may include references to persistent storage media. Database schemas (each database may have a different schema), tables, rows, file addresses, or other information for obtaining information needed to the published at a web sites would need to be known. An employee of the business may need extensive training in programming and know where and how to retrieve information needed to create effectively classes from which others may instantiate objects. The business's ability to launch content may be limited or delayed because that employee (with programming and information retrieval knowledge) is performing too many tasks because most other employees working with the content would be unable to perform such tasks. Alternatively, the business may hire many of such employees but only at great expense. Further, the training of such employees may have emphasized tailoring information for the systems, rather than for the people, that have to deal with that information.

A need exist to allow an enterprise to manage content according to the domain's own vocabulary. A further need exists to allow business users a more active role in defining content attributes and requirements without needing to know a programming language or database administration.

SUMMARY OF THE INVENTION

A method and system of managing content at a network site can allow easier use by business users. A higher level of abstraction can be used to allow business users to create their own objects that may reference or contain other objects or records as managed by a content management system. Business users do not have to learn programming code in order to work those objects, which are content types. A graphical user interface ("GUI") can be used to help the business users to create, modify, and delete the content types. The GUI and the ability for business users to create content types greatly shorten the time between receiving software to operate a network site and launching content at that network site.

In one set of embodiments, a method of managing content at a network site can comprise generating a content type and instantiating a data object from the content type. The generation of the content type can be performed via an application programming interface. The application programming interface can provide access to an application services layer that overlies a content management system.

In another set of embodiments, a data processing system readable medium can having code embodied therein. The code can comprise an instruction for reading information for a content type and an instruction for generating a structured definition of the content type using the information.

In still other sets of embodiments, a system for modeling content can comprise a content management layer and an application services layer over the content management layer. The system can further comprise an application programming interface to the application services layer. The application programming interface may be configured to allow a user to send a content type to the content management layer via the application programming interface and application services layer.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

FIGS. 5-10 include illustrations of windows of a graphical user interface when creating a content type.

Figure 1:
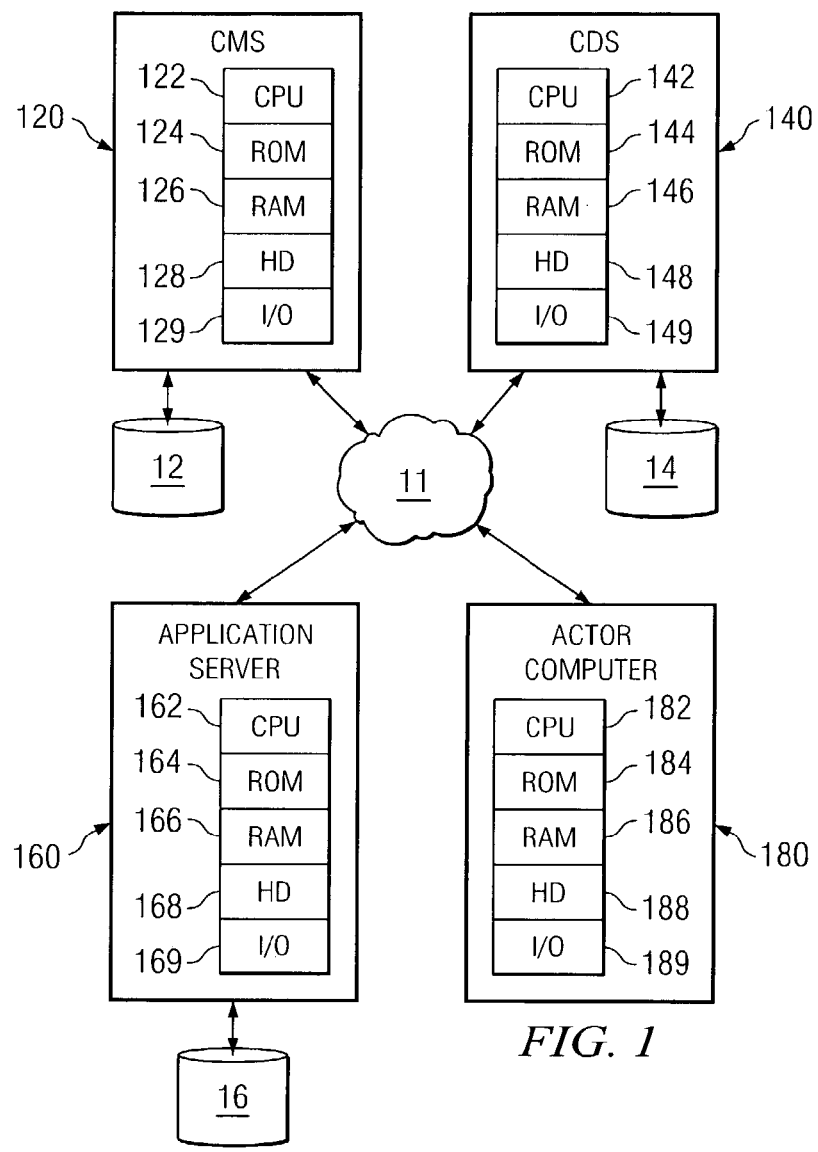
FIG. 1 includes an illustration of a hardware configuration of a network for managing content at a network site in accordance with a specific, non-limiting embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

Method and systems can be used to generate content types at a relatively higher level of the abstraction compared to conventional methods and systems used for creating templates. An application programming interface ("API") may be used with an application services layer that overlies a content management system ("CMS"). A graphical user interface ("GUI") can be a web-based content type generating tool that is coupled to the APT. The GUI can allow users, who may have little, if any, computer programming knowledge, to generate, modify, and delete content types. The content types may use the vocabulary and business rules used by a particular enterprise with which the users work. Business data objects may be instantiated from the content types. In one embodiment, the content types may include attributes, a workflow, access controls, and potentially other information. The content types may be based on a referenced model or a containment model as will be described later in this specification.

A business user can quickly generate and use content types much faster than conventional templates. For example, programmers would write content management applications for the templates. The programmers need to know Java or another programming language. Unlike templates, the content types may specify workflow and access controls for business data objects instantiated from the content types. The workflow allows business data objects to be processed according to the defined workflow. Access controls may be used to allow the proper access for those specified in or monitoring the workflow. The ability for business users to generate, modify, and delete content types using the GUI significantly shortens the time between receiving content management software to operate a network site and launching content at that network site. Such a method and system provides a truly "out-of-the-box" solution to content management.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

The term "business content type" is intended to mean a content type defined in terms of a user's business context.

The term "business data object" is intended to mean an instantiation of a business content type. Business data objects may be instantiated by content contributors, who may be business users.

The term "business user" is intended to mean a person having little, if any, training in computer programming and writing code in a programming language.

The term "channel" is intended to mean a hierarchical navigation of content on a site. A channel can also be used to display content in applications.

The term "content type" is intended to mean a structured definition of an object used to instantiate other objects. The definition may comprise attributes and related data, including workflow, security, status, or other information. The content types can be used for instantiating business data objects.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Before discussing embodiments of the present invention, an exemplary hardware architecture for using embodiments of the present invention is described. FIG. 1 illustrates an exemplary architecture and includes CMS 120, content delivery system ("CDS") 140, and actor computer 160 each bidirectionally coupled to internal network 11.

Each of CMS 120 and CDS 140 is a server computer and is bidirectionally coupled to a corresponding database 12 and 14, respectively. Each of databases 12 and 14 may contain objects and metadata regarding those objects in tables within those databases. A database server (not shown) may lie between any one or more of the databases 12 and 14 and the server computers 120 and 140. More or fewer databases may be used, and a single database may be shared by more than one of server computers 120 and 140. For simplicity, the database server can be considered part of a database.

Actor computer 160 is a client computer as the term is used in client-server relationships. Actor computer 160 can include a desktop computer, a laptop computer, a work station, a personal digital assistant, a cellular phone, or nearly other device capable of communicating over network 11. Other actor computers (not shown) may also be bidirectionally coupled to internal network 11. Individuals using the actor computers may include content developers, editors, content reviewers, webmasters, information technology specialists, and the like. Many of the actors are business users.

Within each of CMS 120 and CDS 140, a plurality of computers (not shown) may be interconnected to each other over internal network 11 or a combination of internal and external networks. For simplicity, a single system is shown for each of CMS 120 and CDS 140. Other systems (e.g., page generator, etc.) may be part of CMS 120 and CDS 140, or additional systems that are bi-directionally coupled to internal network 11.

Although not shown, a visitor computer, which is a client computer, may be bidirectionally coupled to the CDS 140 via an external network (e.g., the Internet). Note that FIG. 1 is a simplification of a hardware configuration. Many other alternative hardware configurations are possible and known to skilled artisans.

The CMS 120 can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.), or the like. CDS 140 can include a server computer comprising CPU 142, ROM 144, RAM 146, HD 148, and I/O 149. CDS 140 may have one or more content delivery software components, a page generator software component, a content management software component, an applications software component, and the like.

Actor computer 160 can comprise a CPU 162, ROM 164, RAM 166, HD 168, and I/O 169.

Each of the computers in FIG. 1 may have more than one CPU, ROM, RAM, HD, I/O, or other hardware components. For simplicity, each computer is illustrated as having one of each of the hardware components, even if more than one is used. The content, typically in the form of objects and database records, and its metadata, if any, may be located within any or all of CMS 120, CDS 140, and databases 12 and 14.

Each of computers 120, 140, and 160 is an example of a data processing system. ROM 124, 144, and 164; RAM 126, 146, and 166; HD 128, 148, and 168; and databases 12 and 14 can include media that can be read by CPU 122, 142, or 162. Therefore, each of these types of memories includes a data processing system readable medium. These memories may be internal or external to computers 120, 140, or 160.

Figure 2:
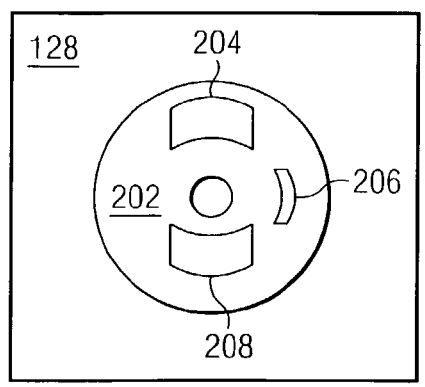
FIG. 2 includes an illustration of a data processing system storage medium including software code having instructions in accordance with an embodiment of the present invention.

Portions of the methods described herein may be implemented in suitable software code that may reside within ROM 124, 144, or 164; RAM 126, 146, or 166; or HD 128, 148, or 168. The instructions in an embodiment of the present invention may be contained on a data storage device, such as HD 128. FIG. 2 illustrates a combination of software code elements 204, 206, and 208 that are embodied within data processing system readable medium 202 on HD 128. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of compiled C++, Java, or other language code. Other architectures may be used. For example, the functions of any one of the computers may be performed by a different computer shown in FIG. 1. Additionally, a computer program or its software components with such code may be embodied in more than one data processing system readable medium in more than one computer.

In the hardware configuration above, the various software components (e.g., content delivery, page generator, content management, or the like) may reside on a single server computer or on any combination of separate server computers. In alternative embodiments, some or all of the software components may reside on the same server computer. For example, the content delivery software component and the page generator software component could reside on the same server computer.

Communications between any of the computers in FIG. 1 can be accomplished using electronic, optical, radio-frequency, or other signals. For example, when a user is at actor computer 180, actor computer 180 may convert the signals to a human understandable form when sending a communication to the user and may convert input from a human to appropriate electronic, optical, radio-frequency, or other signals to be used by, systems 120 or 140. Similarly, when an operator is at CMS 120, its server computer may convert the signals to a human understandable form when sending a communication to the operator and may convert input from a human to appropriate electronic, optical, radio-frequency, or other signals to be used by actor computer 160 or systems 120 or 140.

Attention is now directed to descriptions of managing content at a network site. Business content types can be created by business users without an extensive knowledge of a programming language. The business content types can be defined in terms that are easier to understand by the business users without affecting how the data are handled by CMS 120.

Figure 3:
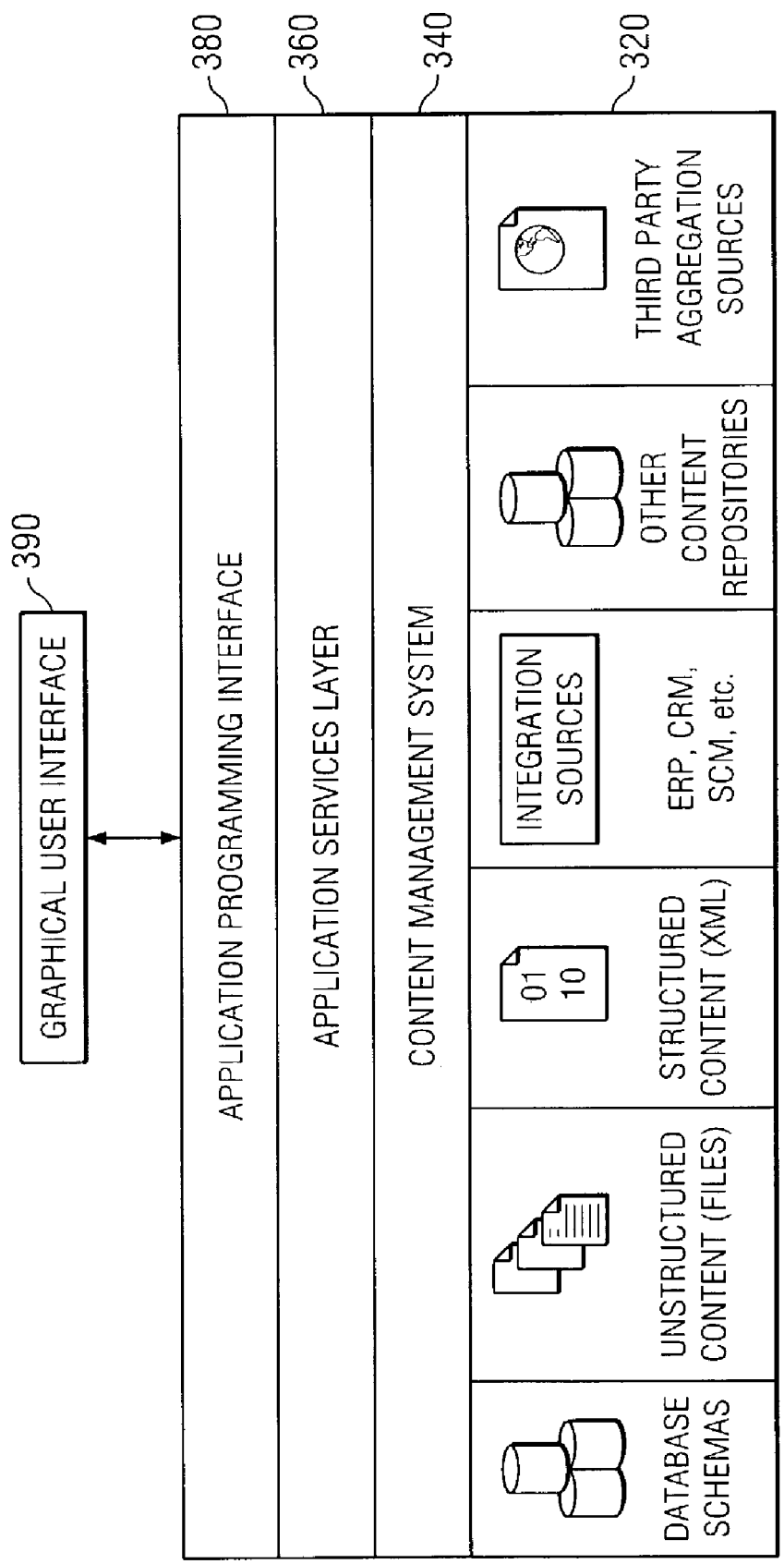
FIG. 3 includes an illustration of a logical layer depiction of a network site.

In one embodiment, different levels of abstraction can be used to separate the management of data within persistent data sources from content types used in instantiating business data objects, where the business data objects may use the data within the persistent data sources. FIG. 3 includes an illustration of different logical layers for content and its management. Persistence layer 320 can include all objects, records, metadata for the objects and records, and other data (collectively "data") used at the network site. The data can reside in a variety of persistent data sources. The data may be located within different persistent data sources include databases, unstructured content (e.g., text files, image files, etc.), structured content (e.g., XML documents), integration sources (e.g., Enterprise Resource Planning ("ERP"), Customer Relationship Management ("CRM"), Software Configuration Management ("SCM"), etc.), other content repositories, and third party aggregation sources (e.g., news wire services, etc.).

Content management system ("CMS") 340 can control data within persistence layer 320 that are used at the network site. Application services layer 360 overlies CMS 340 and provides an interface to CMS 340 that allows operations to be performed on data within persistence layer 320. API 380 overlies application services layer 360. Other APIs to application services layer 360 may be present but are not shown in FIG. 3.

The interfaces from application services layer 360 (to GUI 390) and CMS 340 (to application services layer 340) may be generic. With such a configuration, other user interfaces (not shown) to API 380 may be added with little additional complexity. Also, other software components (not shown) above CMS 340 and at the same level as application services layer 360 may be easily added.

GUI 390 can be coupled to API 380 and allows business users to generate, modify, and delete higher-level objects (i.e., objects that reference or contain other data within persistence layer 320) to be generated in a manner consistent with how an enterprise thinks about its content. Because the content types are objects that reside at a higher level compared to records and objects at leaf nodes (i.e., objects that do not refer to other objects), GUI 390 can allow business users to generate, modify, or delete content types without having to know a programming language. GUI 390 can be a user friendly, web-based modeling tool that may be used after a little training, and in some cases, less than an hour of training. The time from installation of the methods and system described herein to launch of content can be performed much quicker and at a fraction of the cost (since programmers are not required and time to generate the content types is faster than coding even if the programmers were to generate the content types). The content types essentially replace conventional templates that required programmers to code. Further, unlike conventional templates, the content types may have an associated workflow and access controls to allow for a more automated development, processing, deployment of content, and a role-based monitoring system for monitoring the business data objects instantiated from the business content types.

GUI 390 may allow business users at actor computer 160 to define business content types in terms of the business's needs and in the business's own vocabulary. The business content type, which is an object type, can comprise an XML document of a structured definition of the content type. A business user can model the content type based on the content structure desired by the business user. The business user may specify business rules that a business data object created from the content type will need to follow, who has what access to business data objects.

GUI 390 may present a business user at actor computer 160 with one or more entry forms. Each attribute in the entry form can include a configurable control with an eXtensible Style Language Transformation ("XSLT"). GUI 390 may allow the content types to model complex database relationships, such as one to one (employee/image of employee), one to many (product category/SKUs for products within the product category), and many to many (articles/authors).

The business content type may have its dependencies managed by containment, reference, or a combination of them. For containment, all data for a business data object can be created, updated, deleted, versioned, associated, staged (put through a workflow), and published (deployed) as a single entity. As an example, a business content type may contain several different records that are parts of different databases. For reference, all objects referenced within a business data object (instantiated from the content type) may or may not be processed together. If a referenced object has already been deployed, it may not be re-deployed when the business data object referencing it is deployed.

GUI 390 can be configured to include many extensibility points. For instance, an XML Schema Definition ("XSD") can be added. XSD can be a structured definition for a valid XML document in lieu of a Document Type Definition ("DTD"). XSD allows a user to define complex data types for the document. The content type can be generated so that it overrides a content management applications presentation for a Java Server Page ("JSP"). Custom controls may be added to allow data selection from other data sources. A default workflow process can be associated with each content type.

Figure 4:
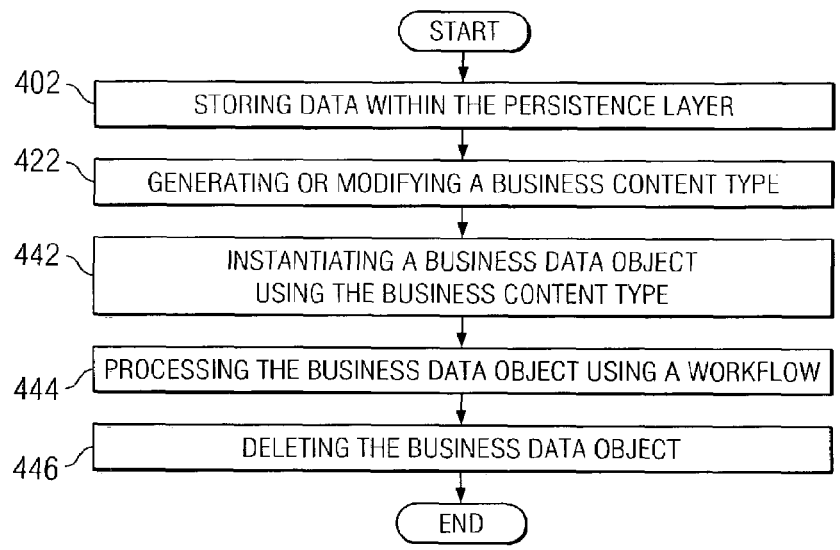
FIG. 4 includes a process flow diagram of a method of using managing content at a network site in accordance with an embodiment of the present invention.

Attention is now directed to FIG. 4 that includes an exemplary process flow for managing content at a network site. The method can comprise storing data within the persistence layer (block 402), generating or modifying a business content type (block 422), instantiating a business data object using the business content type (block 442), processing the business data object using a workflow (block 444), and deleting the business data object (block 446). Each operation will be explained below in more detail.

Note that not all the activities described in the process flow diagram are required, that an element within a specific activity may not be required, and that further activities may be performed in addition to those illustrated. After reading this specification, skilled artisans will be capable of determining what activities can be used for their specific needs.

Attention is now directed to details of managing content at a network site. Referring to FIG. 4, the method can comprise storing data within persistence layer 320 (block 402). The data may originate within the business managing the network site or may come from a third party. The data comprises the information that will form the content delivered by the network site. The data can comprise other information that is not published at the network site (e.g., the enterprise's internal records). Databases and their schemas and repositories with files and other data are typically designed to work best with the particular hardware and software configuration of the network site. Referring to FIG. 1, the data should be stored in a manner in which CMS 120 and CDS 140 can work quickly, efficiently, and without any significant errors. Therefore, names and locations of data within persistence layer 320 may be dictated by hardware and software considerations and may not be user friendly or even make sense to business users. In one embodiment, content and metadata regarding that content may be stored in different persistent data sources.

The method can also comprise generating or modifying a business content type (block 422). The business content type may be generated or modified using GUI 390 as will be described with respect to window views later in this specification. During generation or modification of the business content types, a business user at actor computer 180 can use GUI 390 to create or edit attributes. For example, an article content type can include attributes, such as a title, a byline, an image, text, and the like.

During the generation or modification of the business content type, the business user may also specify workflow, security, status, or potentially other information. The workflow may define business rules to be followed when a business data object is instantiated from the business content type. The workflow may designate who may create the business data object, who may be editors and approvers, and potentially when and how to publish or deploy the content corresponding to the business data object. Security can be used to designate access privileges for activities, such as create, modify, read-only, delete, and the like. When the information for the business content type has been input, the business content type may be automatically saved by CMS 120 as a structured definition of the content type in XML.

After the business content type has been generated or modified, the method can further comprise instantiating a business data object using the business content type (block 442). Using the article example, the business data object may include an article data object instantiated from the article type content type. The article identifier may be automatically generated. GUI 390 may allow a content contributor to input a title, an author, an image, and text. The author information may include an identifier that is an author business data object backed by data in an author information database. The business data object can reference an image file that includes an image related to the subject matter of the article or a photograph of the author. The image may be persisted in a different persistent data source compared to the author information (file source versus database).

The method can comprise processing the business data object using a workflow (block 444). The workflow can define business rules for the business data object from the time it is developed to the time it is published. Each stage of the workflow may have policies to be followed when performing a specific action, such as development, editing, publishing, and the like.

If the data is ever obsolete, the business data object may be deleted. The method can further comprise deleting the business data object (block 446 in FIG. 4). When the business data object is deleted, the data is no longer accessible at the network site. The examples below are used to illustrate how GUI 390 is used for generating or modifying content types, instantiating business data objects, and tracking tasks. More than one GUI may be used for the different functions (defining content types versus instantiating business data objects versus monitoring status of business data objects). Windows of GUI 390 for generating or modifying content types are illustrated in FIGS. 5-10. Each of the figures will be described in more detail.

Figure 5:
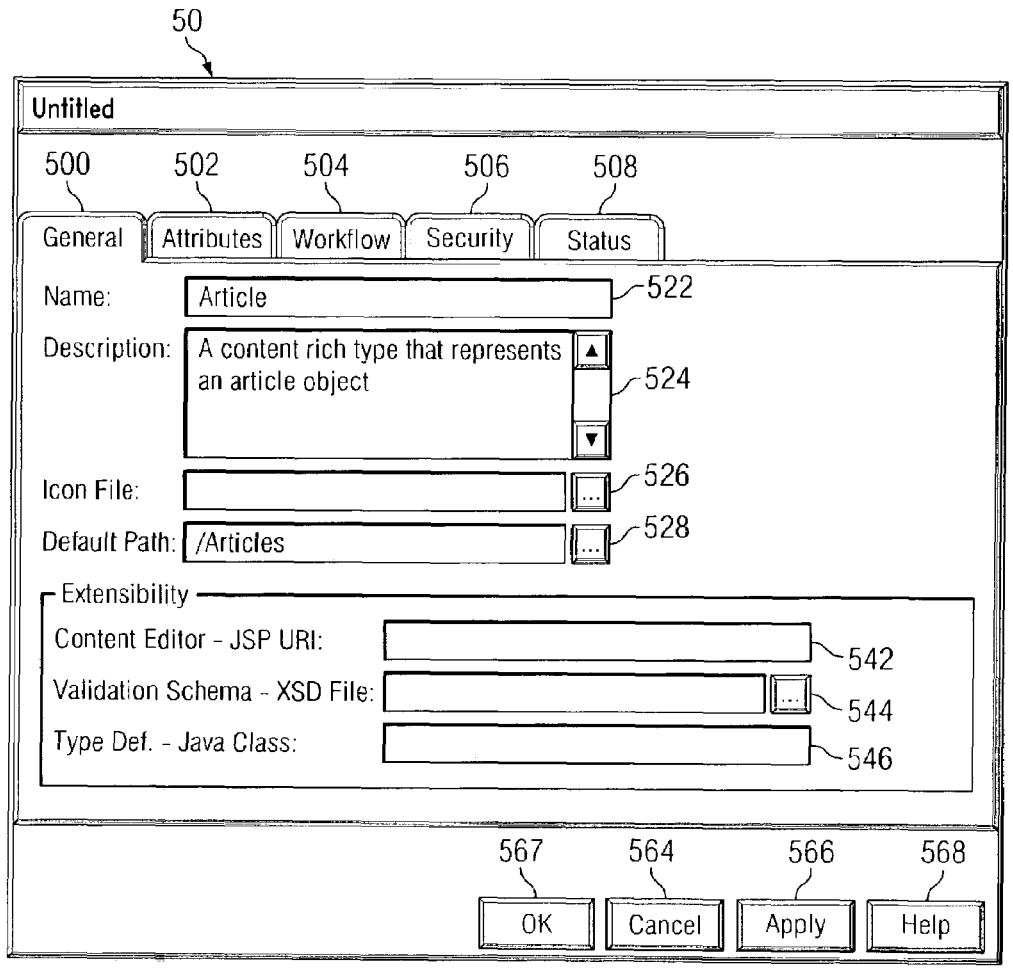

FIG. 5 includes an illustration of window 50 for creating a business content type. Window 50 includes tabs entitled general 500, attributes 502, workflow 504, security 506, and status 508. The content type includes name 522 that may include a string of characters. In this specific example, "Article" is name 522 of the business content type. Description 524 includes a text area that can be used to describe the business content type. Icon file 526 can be used to display an icon to allow for an easy instantiation of business data objects by clicking on the icon. Default path 528 can be used to define the default path in which business data objects instantiated using this business content type will be stored.

FIG. 5 includes an extensibility section that includes content editor 542, validation schema 544, and type definition 546. The extensibility section of the content type generation GUI provides hooks to actor computer 180 to customize the behavior of the content management application.

Content editor 542 provides the user a place to register a page to override the look and feel of the default generated form and to enter the data for a content instance object (of the specified type). The user may have layout or look and feel requirements dictated by their organization and will need to override the default form.

Validation schema 544 allows the user to register an XSD file with the content type for server-side validation of the data entered at content instance creation time (usually via the generated GUI form). Verification of validation scheme 544 may be accomplished by having the user create a pre-persistence listener to validate the object against the XSD. The pre-persistence listener class can be another example of engineered extensibility in the system.

Type definition 546 can be a new class that allows the user to register a Java class with the content type object. In this manner, the new class can inherit from a pre-existing class. The purpose of type definition 546 is to provide custom logic inside of the new class yet still provide the same interface that the GUI tools use.

If the information for the business content type is acceptable, OK tile 562 can be activated. Alternatively, if information for the business content type is not acceptable, a business user may activate cancel tile 564. In still other instances, a business user may activate apply tile 566 or activate help tile 568 if the business user needs more assistance. When the business content type is saved, the information is automatically serialized within a structured definition expressed in XML.

FIG. 6 includes an illustration of window 60 comprising the attributes for the article content type. The business user may specify the data sources using the tile 602. Below data source 602 includes an attribute list. A business user may add a new attribute 622, add a new data source 624, move up within the list 626, move down with the list 628, or remove an attribute 630.

Each of the attributes may include attribute name 640, which can be a user-friendly name that business users may change to match the vocabulary of business users or content contributors. This name does not need to be in a form that a computer program would require to operate. Each attribute may also include XML name 642. This name will need to be in a form consistent with XML because an XML definition of the content type is generated using XML name 642. Therefore, the name may not have any spaces or may be otherwise limited. The attribute may include variable type 646. As illustrated in FIG. 6, the types include integer and character string. In another embodiment, other variable types, such as float, double, or the like may be used. When a character string is used, length 648 may be specified. For integers, the length may not be applicable. However, for strings, this may be nearly any finite number. In this specific example, the string lengths are either 255 characters long or 1024 characters long.

Each attribute may include widget 650, which may also be considered a control. In this specific example, the article identifier will use a widget that sequentially numbers the articles. For the title and summary, a text widget will allow a single line of text to be typed when a business data object is instantiated from this content type. The body includes a text area widget. The author can be chosen using a select widget that can display authors using a pull-down menu. An image for the article may be selected using a file widget that will be used to select a file that contains an image.

A business user can designate whether each attribute will be searchable 652, whether any of the attributes will be a default label 654 for a subsequently created business data object, which attributes would be displayed in a summary 656 of a subsequently created business data object, and what portions of the information may be visible 658. More or fewer variables for each attribute may be used as desired.

Figure 7:
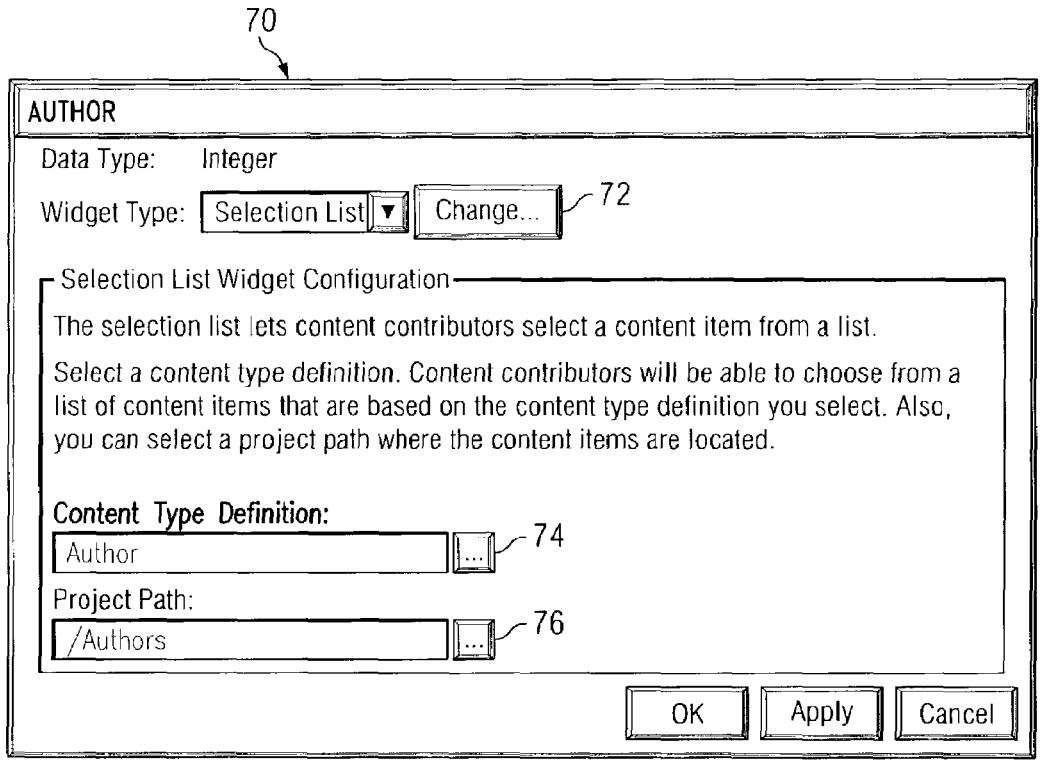
Figure 8:
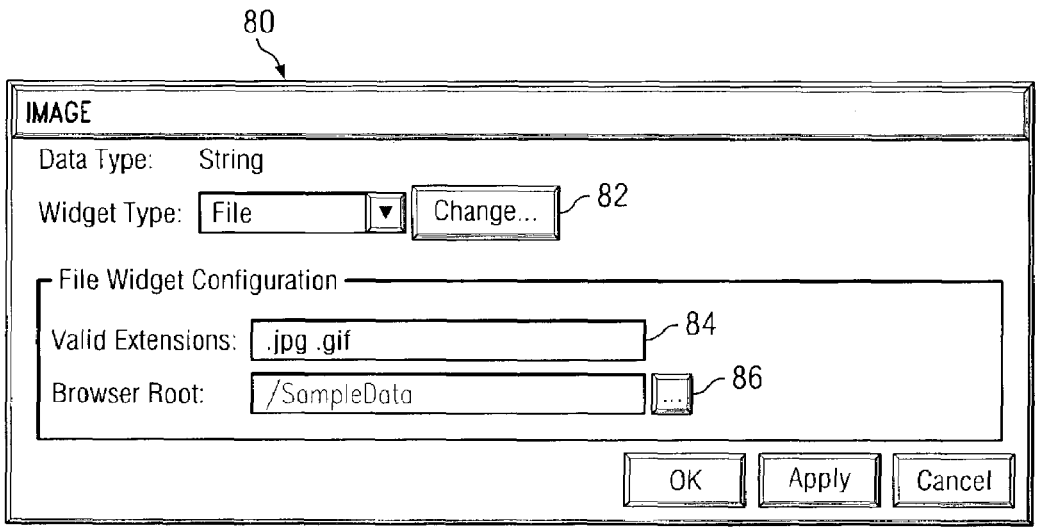

A business user may click on any of the items illustrated under name 640. FIGS. 7 and 8 include windows 70 and 80, respectively, for the author and image attributes. Referring to FIG. 7, the author can be represented by an integer data type. Widget type 72 is currently listed as a selection list. If desired, a business user could change the widget to a different type of widget. For example, the select list widget may be replaced by a text widget so that name of the author could be typed by a content contributor. For a text widget, the data type may be changed to a character string, and a limit the length of the character string may be input. With the select list, the business user may need to access a pre-existing table in a database having information of authors. If so, definition 74 and project path 76 may need to be selected.

Referring to FIG. 8, the image has a string data type and has widget type 82 similar to widget type 72. Widget type 82 is currently set to be a file. The business user can also designate valid extensions 84 allowed for the image files. In this specific example, valid extensions may be .jpg or .gif files. The business user may select browser root 86. Browser root 86 can be used as the default directory from which image files may be selected. In this specific example, browser root 86 would be within a folder entitled "SampleData."

At this point, a business content type for an article may be generated. The article content type example is based on a referenced model. When a business data object is instantiated from the business content type, the objects referenced within the business data object may or may not be processed together. If one of the referenced objects has already been deployed, it will not be re-deployed when the business data object is deployed.

FIG. 9 includes a window 90 that has a content type entitled "Product." The prior example with an article content type used references. For the product content type, containment model is used. Referring to the attribute list in window 90, product identifier, product name, and product description may correspond to a product category. The SKU identifier, SKU name, and SKU description may correspond to individual products within that product category. Additional attributes may include color and price. A relator widget may be used, and in FIG. 9, is illustrated the second occurrence of "PRODUCT_ID" in the attribute list.

Figure 10:
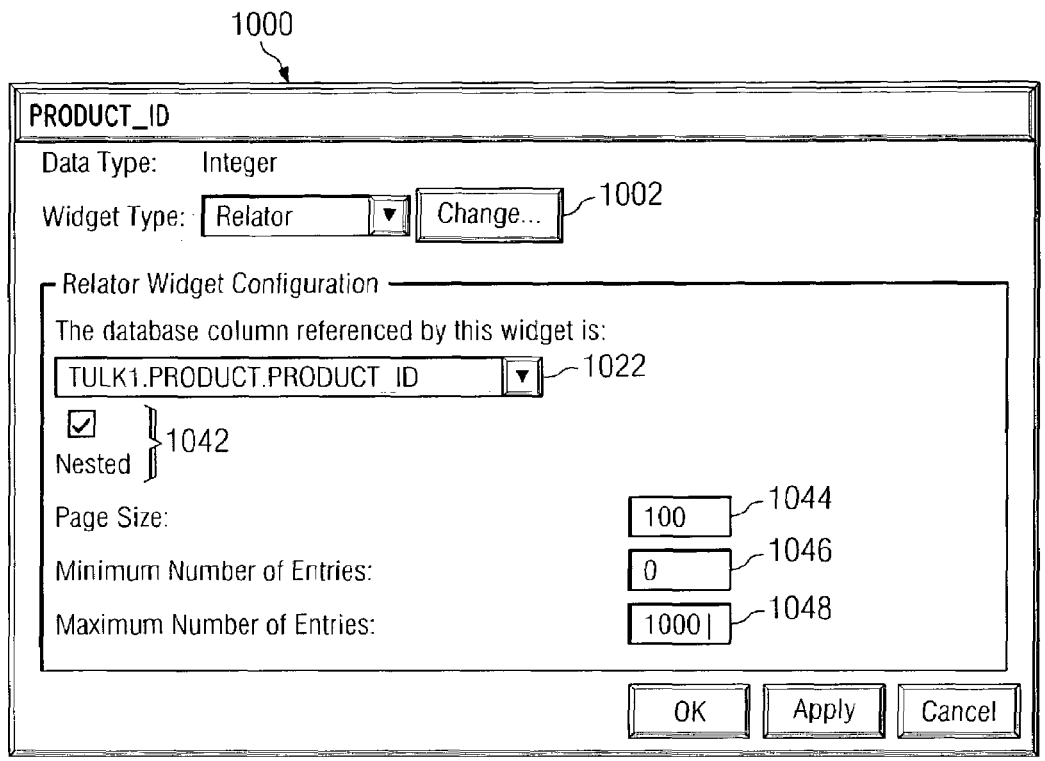

FIG. 10 includes a window 1000 for the "PRODUCT_ID" relator widget. The data type is an integer, and widget type 1000 is a relator. The relator widget can be used for locating tuples within databases. The relator widget is used to manage containment within the business data object. The business user may select a database column reference as item 1022. The entries may be nested as noted by item 1042. If the entries are nested, a separate form is generated for content entry and edit. If the nested checkbox 1042 is not selected, a single form is used to create the appearance of a monolithic object. In both cases, there is a relationship between data in multiple tables and the object uses a containment model. Page size 1044 may be specified, and in this example, is 100. The business user may also input a minimum number of entries 1046 and a maximum number of entries 1048. In this example, the number of entries may be from 0-1000. Therefore, up to 1000 different products may be within this product category, and each page may display up to 100 products.

Each of the individual products is contained within the product category. In other words, the business data object and all other data from persistence layer 320 that are contained or "nested" within it are treated as a single unit. In other words, the business data object will be processed through the workflow and deployment as a single unit.

At this point in the process, a business content type has been defined. Note that the entries, which will be defined in the business data object, will be contained within a product data object.

Figure 11:
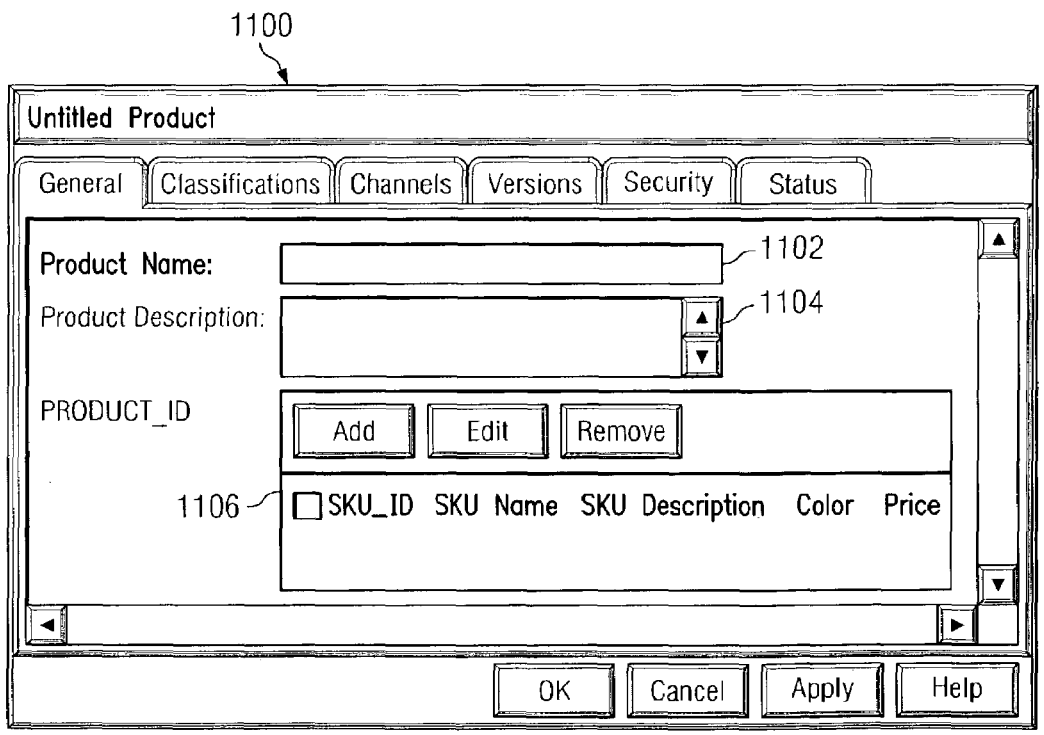
FIGS. 11-17 include illustrations of windows of a graphical user interface when instantiating and developing business data objects.

A business user can instantiate a business data object from a business content type, such as the example as illustrated in FIGS. 9 and 10. Window 1100 in FIG. 11 may be displayed to a content contributor who wants to instantiate a business data object using the product content type. The content contributor can enter product name 1102, which in this case is a name of a product category. The content contributor may enter product description 1104. Block 1106 includes a display of the products currently contained within the database. Note that block 1106 includes the SKU identifier, SKU name, SKU description, color, and price as previously described in FIG. 9. Products may be added, removed, or edited.

Figure 12:
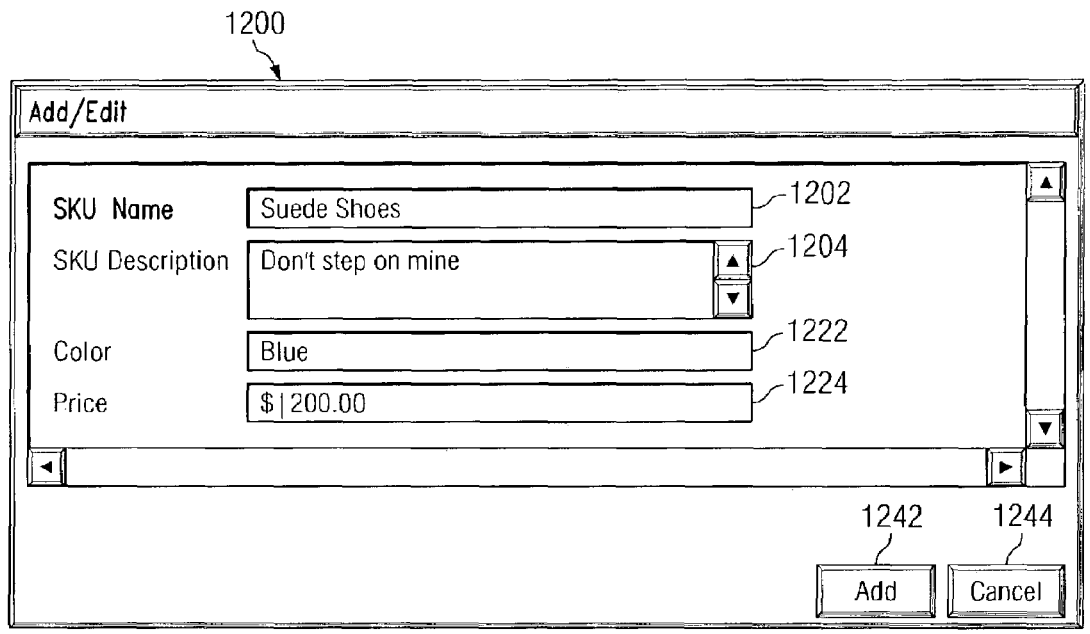

When the add or edit tablet is activated, window 1200 as illustrated in FIG. 12 may be displayed. SKU name 1202, SKU description 1204, color 1222, and price 1224 may be entered or modified for each product in the product category. When finished, the add tablet 1242 may be activated. Otherwise, the cancel tablet 1244 may be activated.

Figure 13:
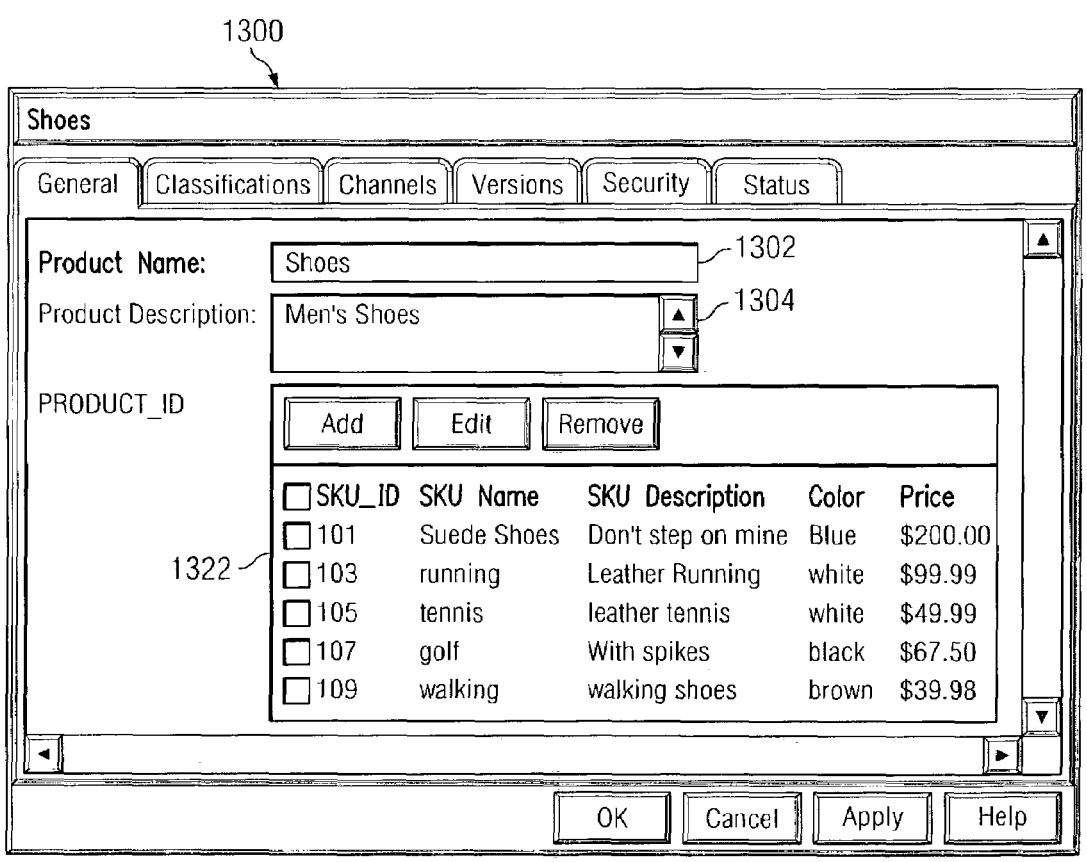

FIG. 13 includes window 1300 for a product category of men's shoes. Window 1300 includes product name 1302, product description 1304, and five different products within block 1322.

Figure 14:
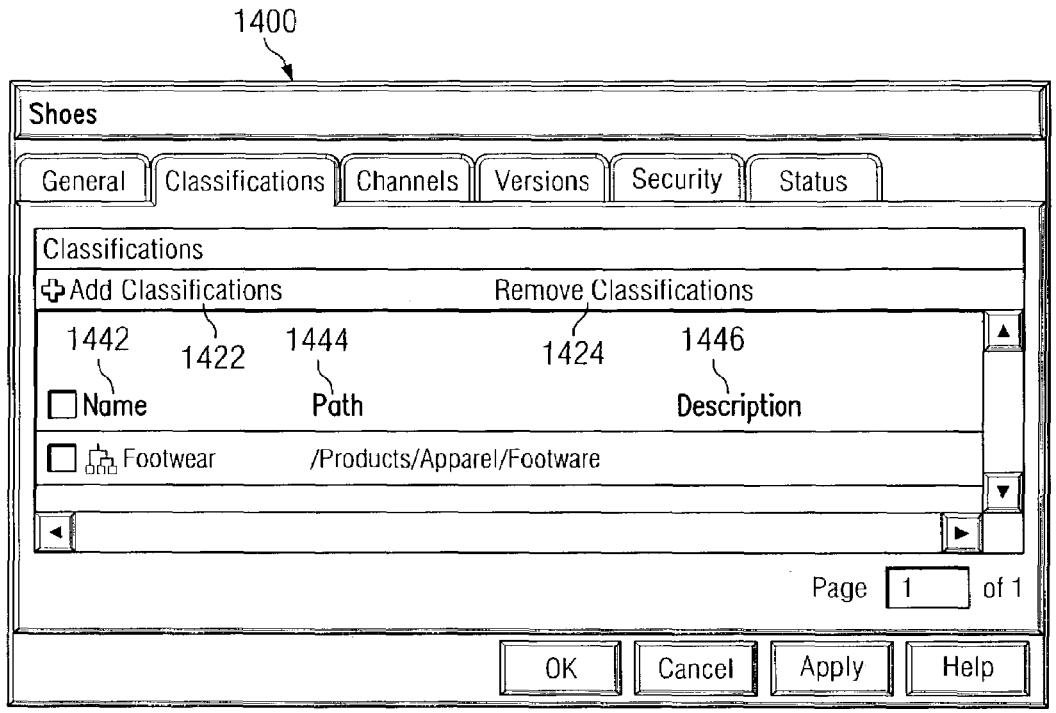

FIG. 14 includes window 1400 that allows for classifications of the business data object being instantiated. The classification can be part of a content taxonomy. With the content taxonomy, the classifications can be used for personalization, reporting, searching, and campaigns. A business user can add classifications 1422 or remove classifications 1424. Each classification may be displayed with name 1442, path 1444, and description 1446.

Figure 15:
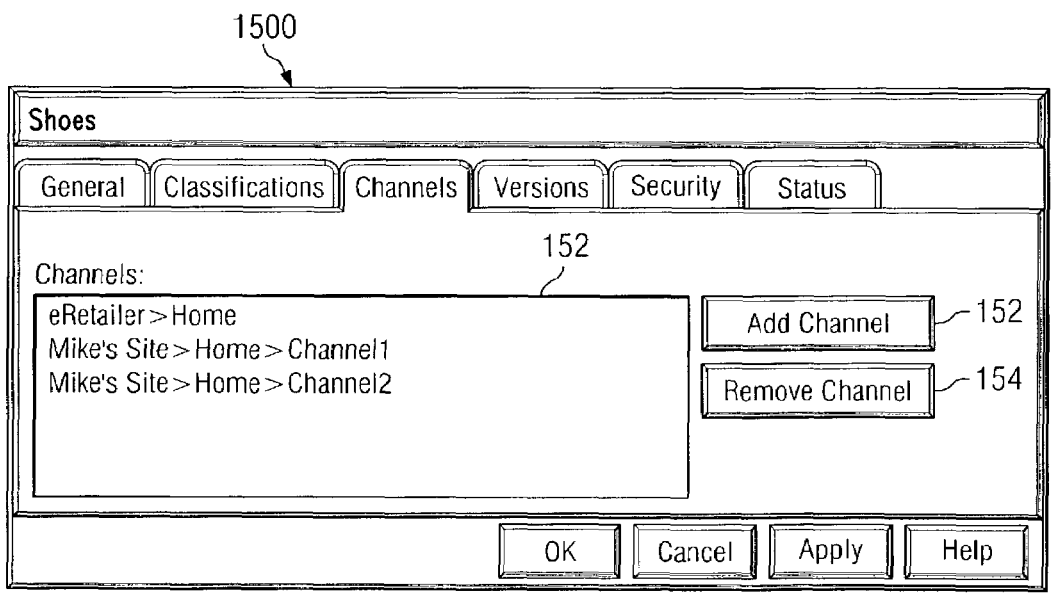

FIG. 15 includes an illustration of a window 1500 that is directed to channels. Channels can belong to sites that map to some physical topology via a sequence of deployment groups. Content may not be deployed unless it is assigned to one or more channels. The content can then be deployed either directly, via the channel, or via the site containing the channel (provided that the site and channel are approved). Block 152 includes a list of channels. A business user may add a channel 152 or remove a channel 154.

Figure 16:
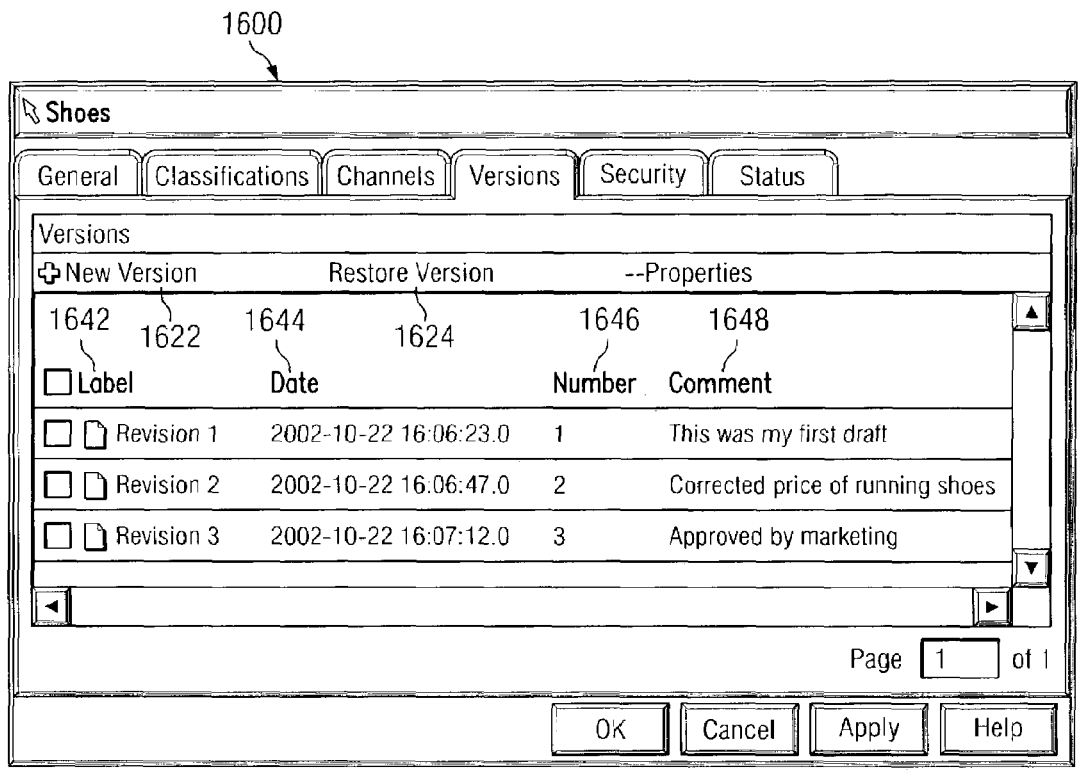

FIG. 16 includes an illustration of window 1600 regarding versions of the business data object. A business user can create a new version 1622 or restore a prior version 1624. Each version may include label 1642, date 1644, version number 1646, and comments 1648.

Figure 17:
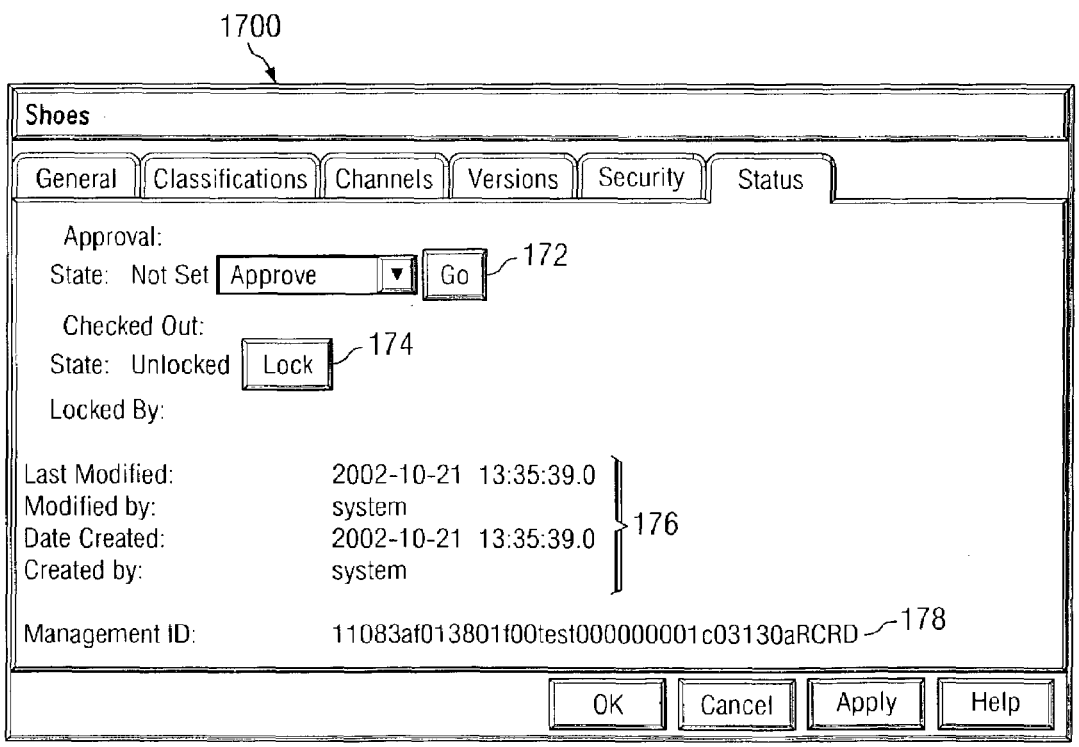

FIG. 17 includes an illustration of window 1700 that displays the status of the business data object. The information may include approval state 172, checked-out state 174, creation and modification information 176, and management identifier 178, which may be the identifier of the specific business data object being created.

The embodiments can provide an "out-of-the-box" content management solution. The time to install and configure a content management system and launch content from a network site can be reduced because programmers do not have to write code for the content types. After the software is installed, the business users can start generating or modifying content types quickly. Therefore, content contributors may start instantiating business data objects from the content types in a shorter time period.

Part of the method and system can be achieved by using different levels of abstraction. By creating a higher level of objects, which can be the business content types, those objects can be used without needing to know how data is managed by CMS 120. Therefore, business users may operate at a higher level and not have to understand the complexities of how content is managed by CMS 120 or even understand a programming language. Business user can be work at the higher level and use naming conventions and rules that that makes sense to the business users.

Also, business content types may be generated and modified using a GUI designed for ease of use from the perspective of business users working with the content types. The GUI can be configured to let a business user add or remove attributes and reference nearly any number of other data in different persistent data sources without knowing a programming language. The attributes can have names that are more descriptive and easier to use by the business users that will need to work with the business data objects created from the business content types. In effect, the business user is creating a "template" without having to write code.

Unlike templates, the content types may also include definitions for workflow, security, status, and potentially other functions. The content types can be edited using the GUI at any time. The same or other business users can use another GUI to instantiate business data objects from the content types defined using the GUI.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of managing content at a network site comprising:
    generating at least two content types;
    generating a business content type wherein the business content type references the at least two content types and specifies at least one rule, wherein the generating is performed by using an application programming interface overlying a content management system;
    instantiating a data object from each of the at least two content types each of the content types corresponding to a different type of data, where each of the content types comprises at least one attribute selected from each of two distinct persistent data sources, where each of the two distinct data sources is configured according to a different schema;
    representing data with each of the data objects, wherein each data object represents data in one of the distinct persistent data source;

instantiating a business data object from the business content type;

associating the business data object with each of the data object; and managing the business data object according to the at least one rule, wherein the at least one rule comprises a workflow for the data object and managing the business data object comprises managing the data represented by each of the data objects in each of the distinct persistent data sources with the content management system according to the at least one rule, wherein managing the data comprises accessing or storing data in at least one of the two distinct data sources.

2. The method of claim 1, wherein generating the business content type and the at least two content types is performed using a graphical user interface that is coupled to the application programming interface.

3. The method of claim 1, wherein generating the content types comprises specifying attributes.

4. The method of claim 3, wherein the at least one rule comprises an access control.

5. The method of claim 3, wherein the attributes comprise an attribute name understood by business users, an XML name, a variable type, and a widget.

6. The method of claim 5, wherein each of the content types is based on a referenced model or a containment model.

7. The method of claim 3, further comprising saving the content types, wherein saving the content type automatically generates an XML definition of the content type.

8. A computer readable media, comprising instructions executable for providing:

an application programming interface overlying a content management system, wherein the application programming interface is configured to allow a user to generate at least two content types and a business content type wherein:

each of the content types corresponds to a different type of data and comprises at least one attribute selected from each of two distinct persistent data sources, the two distinct data sources configured according to a different schema, the business content type references the at least two content types and specifies at least one rule, a data object is instantiated from each of the at least two content types, each data object representing data in one of the distinct persistent data sources, and a business data object is instantiated from the business content type, the business data object associated with each of the data objects and the business data object is managed according to the at least one rule, wherein the at least one rule comprises a workflow for the data object and managing the business data object comprises managing the data represented by each of the data objects in the distinct persistent data sources with the content management system according to the at least one rule, wherein managing the data comprises accessing or storing data in at least one of the two distinct data sources.

9. The system of claim 8, wherein generating the business content type and the at least two content types is performed using a graphical user interface that is coupled to the application programming interface.

10. The system of claim 8, wherein generating the content types comprises specifying attributes.

11. The system of claim 10, wherein the at least one rule comprises an access control.

12. The system of claim 10, wherein the attributes comprise an attribute name understood by business users, an XML name, a variable type, and a widget.

13. The system of claim 12, wherein each of the content types is based on a referenced model or a containment model.

14. The system of claim 10, further comprising saving the content types, wherein saving the content type automatically generates an XML definition of the content type.

* * * * *